United States Patent [19]

Richter

[11] Patent Number: 4,796,514
[45] Date of Patent: Jan. 10, 1989

[54] ROTARY/LINEAR CONVERTOR

[76] Inventor: Paul A. Richter, 33 Breadalbane Street, Carindale, 4152 Queensland, Australia

[21] Appl. No.: 87,257
[22] PCT Filed: Oct. 10, 1986
[86] PCT No.: PCT/AU86/00302
§ 371 Date: Jan. 29, 1987
§ 102(e) Date: Jan. 29, 1987
[87] PCT Pub. No.: WO87/02412
PCT Pub. Date: Apr. 23, 1987

[30] Foreign Application Priority Data

Oct. 11, 1985 [AU] Australia .................. PH2867/85
Mar. 26, 1986 [AU] Australia .................. PH5216/86

[51] Int. Cl.⁴ ..................... F01B 3/00; F01B 7/10; F01B 7/02
[52] U.S. Cl. ........................... 92/33; 92/65; 92/69 A; 92/69 B; 92/70; 92/75; 92/76; 92/150; 74/102
[58] Field of Search ............... 92/68, 69 R, 69 B, 70, 92/71, 138, 12.1, 12.2, 31, 33, 50, 65, 75, 76, 150, 151; 74/99 R, 102

[56] References Cited

U.S. PATENT DOCUMENTS 1,613,116  1/1927  Michell ..................... 92/70 X
3,130,592  4/1964  Burrison ................... 92/69 R X
4,090,478  5/1978  Trimble et al. ............. 92/71 X
4,180,028 12/1979  Richter .................... 123/45 A

FOREIGN PATENT DOCUMENTS 501555   7/1977  Australia .
173833   5/1935  Switzerland ............... 92/70
1560093  1/1980  United Kingdom .

Primary Examiner—Robert E. Garrett
Assistant Examiner—Mark A. Williamson
Attorney, Agent, or Firm—Fleit, Jacobson, Cohn & Price

[57] ABSTRACT

A rotary/linear convertor which comprises a first member may be in the form of a piston (14, 15, 16, 17, 114, 115, 116, 117) and a guide which is preferably in the form of a cylinder (12, 112) the first member being arranged for linear movement within or along the guide and a second member (23, 24, 137) which is adapted for rotational movement. The convertor further includes connecting means operatively connecting the first and second members so that the respective linear or rotational movement of one member causes the respective linear or rotational movement of the other member. The connecting means comprises a connecting shaft (20, 120, 121, 122, 123) disposed eccentrically of the central axis of the first member, first coupling means (29, 29a, 28, 28a, 127, 131) operatively connecting the first member to the connecting shaft so that axial reciprocation of that first member causes orbital movement of the connecting shaft and vice versa and second coupling means (21, 22, 132, 133, 134, 135) operatively connecting the connecting shaft to the second member so that the orbital movement of the connecting shaft causes rotation of the second member and vice versa.

11 Claims, 3 Drawing Sheets

U.S. Patent   Jan. 10, 1989   Sheet 1 of 3   4,796,514
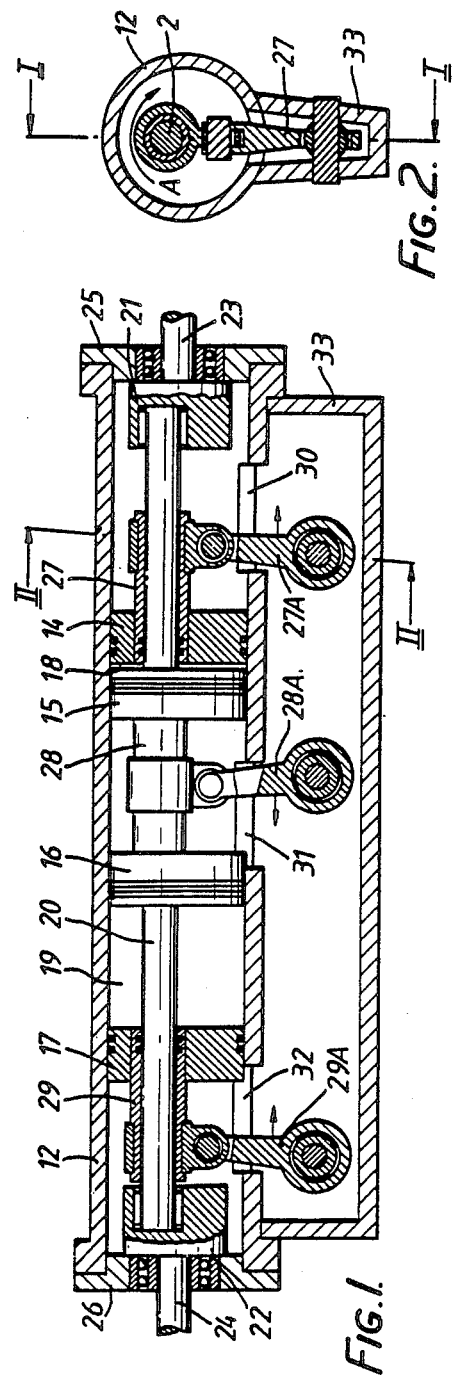
FIG. 1.
FIG. 2.
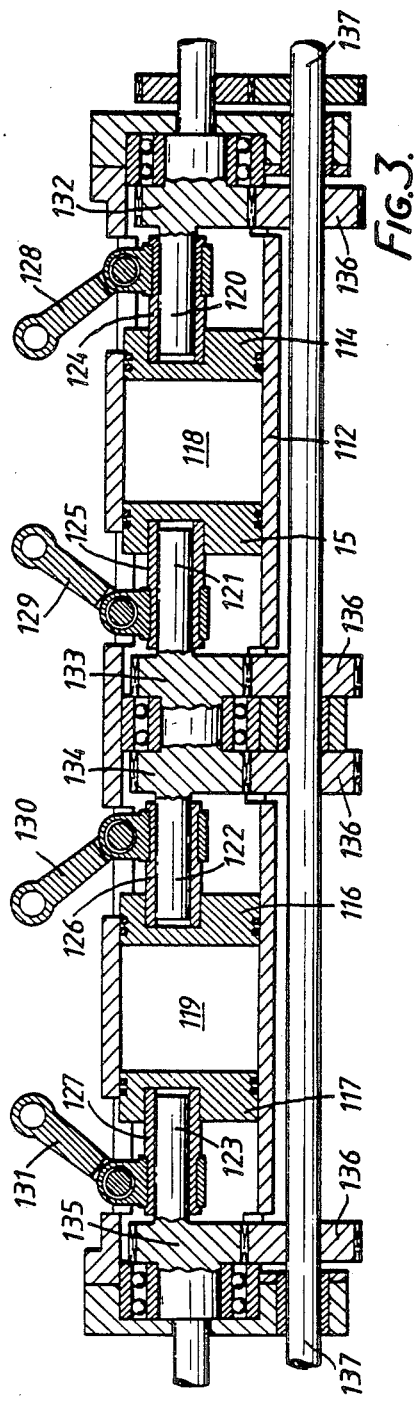
FIG. 3.

ROTARY/LINEAR CONVERTOR

This invention relates to a device for converting linear motion to rotary motion and vice-versa. For example, the principles of this invention may be applied to a fluid operated engine or motor and particularly to such a device which is capable of producing rotary motion of a shaft to power motor vehicles, farm machinery, and stationary devices such as pumps, heat exchangers, generators and so on.

In particular, the engine or motor of this preferred application is capable of being operated by a wide range of fluids and in fact may be operated with any type of expandable fluid, whether or not prior ignition is required. Thus, the device may be operated with a compressed or pressurised fluid such as air, steam or helium which is allowed to expand, or alternatively the motor may be operated with fluids such as petrol, gas or other hydrocarbon or similar fuel which require ignition to cause the necessary expansion. Conversely, when operated as a pump, the device of this invention may be used to pump or compress both liquid and gaseous fluids.

In Australian Patent Specification No. 501555, there is described a fluid operated device comprising: a cylinder member, at least two mutually opposed piston members movable axially therein, a working chamber within said cylinder member defined by opposing ends of said piston members and the inner wall of said cylinder member, said cylinder member being provided with inlet and outlet means communicating with said working chamber for admission of working fluid to said chamber and for removal of spent working fluid from said chamber, respectively; a shaft member extending through said piston members and said cylinder member concentrically with said members; first coupling means coupling the piston members to one of the other mentioned members such that axial reciprocation of the piston member causes rotation of the piston members relative to said one of the other mentioned members, second coupling means coupling the piston members to the other mentioned members to prevent relative rotation of the piston members and said other one of the other mentioned members while permitting axial reciprocation of the piston members; and valve means in said working chamber operatively coupled to said shaft member for rotation with said shaft member relative to the cylinder member to control movement of working fluid into and out of said working chamber through said inlet and outlet means. In particular embodiments disclosed therein, the first coupling means comprises at least one continuous sinusoidal guidway formed in a surface of either the piston member or the cylinder member, and at least one associated cam follower mounted in a facing surface of the cylinder member or the piston member, respectively, to project therefrom and engage the guideway; and the second coupling means of these embodiments comprises at least one axially extending guideway formed in a surface of the piston member or the shaft member, and at least one associated cam follower mounted in a facing surface of the shaft member or the piston member, respectively, to project therefrom and engage the guideway. In alternative embodiments, the arrangement of the first and second coupling means is reversed in that the first coupling means comprises at least one continuous sinusoidal guideway formed in a surface of the piston member or the shaft member, and at least one associated cam follower mounted in a facing surface of the shaft member or the piston member, respectively, to project therefrom and engage the guideway; and the second coupling means comprises at least one axially extending guideway formed in a surface of the piston member or the cylinder member, and at least one associated cam follower mounted in a facing surface of the cylinder member or the piston member, respectively, to project therefrom and engage said guideway.

It is an object of the present invention to provide an improved rotary/linear convertor which is relatively simple in construction and more efficient. According to the present invention there is provided a rotary/linear convertor comprising;

a first member and a guide, said first member having a central axis and being adapted for linear movement in the direction of said central axis within or along said guide;

a second member adapted for rotational movement;

connecting means operatively interconnecting said first and second members so that respective linear or rotational movement of one said member causes respective linear or rotational movement of the other said member;

characterized in that said connecting means comprises;

a connecting shaft disposed eccentrically of said central axis of said first member;

first coupling means operatively connecting said first member to said connecting shaft such that axial reciprocation of said first member causes orbital movement of said connecting shaft and vice versa; and second coupling means operatively connecting said connecting shaft to said second member so that said orbital movement of said connecting shaft causes rotation of said second member and vice versa.

Preferably the first coupling means comprises a sleeve operatively connected to the first member for axial reciprocation therewith that sleeve being associated with the connecting shaft for axial reciprocation relative thereto and at least one link member extending between the sleeve and a mounting which is in a fixed position. The position of the mixed mounting may be adjustable if desired.

Preferably the second coupling means comprising a disc-like member mounted for rotation about an axis, the connecting shaft being eccentrically connected with respect to that axis to the disc-like member, the second member being operatively connected to the disc-like member.

In one form the first coupling means comprises a plurality of link members extending between the sleeve and, respective mountings which are fixed. Preferably each link member is pivotally connected to said sleeve and to the mounting for limited universal movement.

In one arrangement the second member is operatively connected to the disc-like member co-axially therewith. In another arrangement the second member is radially displaced from the axis of the disc-like member and operatively connected thereto by transmission means. Preferably the disc-like member comprises a circumferential gear section adapted to engage a further gear which is operatively connected to the second member.

Preferably the first member comprises a piston and the guide comprises a cylinder having a working chamber therein. Inlet means and outlet means are provided for communicating with the working chamber for the admission and removal of the working fluid therefrom.

In one preferred form the first member comprises two pistons disposed within the cylinder there being a single working chamber disposed between said pistons.

The device may further include a lubricating and/or cooling system comprising a delivery channel in the connecting shaft and the second coupling means for delivering lubricant and/or coolant from externally of the converter to the first member so that the orbital movement of the connecting shaft assists in distributing the fluid at selected positions at or around the first member. The fluid may be circulated by a pumping action or centrifugal force.

Further features of the present invention will be apparent from the following description of preferred embodiments as illustrated in the accompanying drawings.

In the drawings:

FIG. 1 is a longitudinal section through a first embodiment of a motor constructed in accordance with the present invention (taken along line I—I of FIG. 2);

FIG. 2 is a cross-sectional view along the line II—II of FIG. 1;

FIG. 3 is a longitudinal section through a second embodiment of a motor which is constructed in accordance with this invention;

Figure 5:
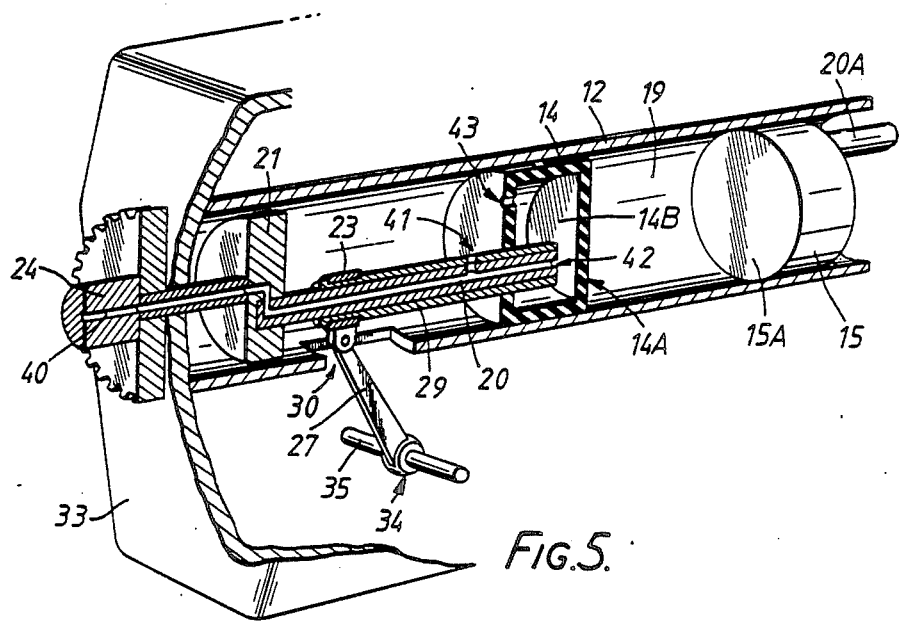
Figure 6:
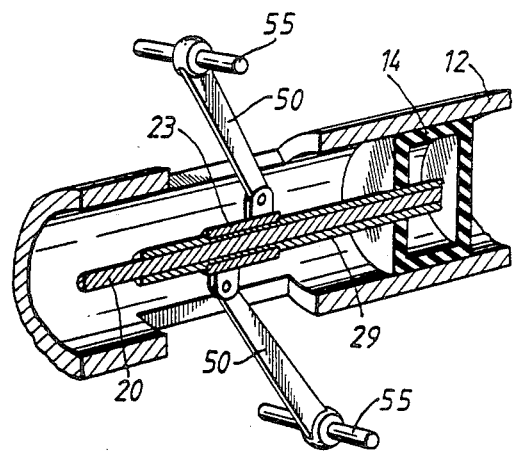

FIG. 5 is a perspective sketch of a single piston, an associated shaft, and their interconnections, partly cut-away at the central, longitudinal section thereof, this sketch being partly schematic; and FIG. 6 illustrates (in a partly sectional, partly schematic drawing) the use of two links between a sleeve on the connecting shaft connected to a piston and respective mounting points for the links on the engine or pump housing.

Means (not shown) such as openings in the cylinder which may be provided with suitable valving arrangements may be provided to communicate with each of the working chambers 18 and 19 for admission of working fluid to each chamber and subsequent removal of working fluid therefrom. The working fluid may either be a fluid under pressure, (for example, a pressurised gas such as air or steam or a pressurised liquid such as hydraulic oil) or a fluid which expands on ignition. In the latter case, each working chamber may also be provided with a suitable ignition device of any known type.

Shaft 20 extends eccentrically of the cylinder 12 and is eccentrically mounted at each end on the inner faces of disc members 21 and 22. Mounted concentrically on the outer faces of disc members 21 and 22 are output shafts 23 and 24, shafts 23 and 24 being mounted for rotation by suitable bearing means in end walls 25 and 26, respectively, of the cylinder 12.

Each of the pistons 14, 15 16, 17 is coupled to shaft 20 such that axial reciprocation of the pistons causes orbital movement of the shaft within cylinder 12. As depicted in FIGS. 1 and 2, this coupling comprises sleeves 27, 28 and 29 surrounding shaft 20 and axially reciprocable thereon. It will be noted that whilst pistons 14 and 17 are mounted at one end of each of sleeve 27 and 29 respectively, pistons 15 and 16 are mounted one at each end of single sleeve 28 for movement in unison of these pistons. Thus, expansion of a working fluid within working chamber 18 will move piston 14 and sleeve 27 to the right, and piston 15 and sleeve 28 to the left, from the positions as shown in FIG. 1. This movement can be utilized to exhaust spent working fluid from chamber 19 by movement of piston 16 also to the left and movement of piston 17 and sleeve 29 to the right, in addition to rotation of the discs 21 and 22 on orbital movement of shaft 20 and hence rotation of output shafts 23 and 24 as will now be described.

Discs 21 and 22 are caused to rotate by axial movement of sleeves 27, 28 and 29 along shaft 20 by means of reciprocating link arms 27A, 28A and 29A which extend through longitudinal slots 30, 31 and 32, respectively in the cylinder 12. Each of the link arms is pivotally mounted at one end thereof to a respective one of the sleeves 27, 28 and 29, and at the other end thereof at a fixed point externally of the cylinder 12 within a longitudinally extending housing 33. (If desired, the embodiment illustrated may be modified so that this fixed point is internally of the cylinder 12). As will be apparent from FIG. 2, each link arm 27A, 28A and 29A is mounted within housing 33 to not only reciprocate axially of the cylinder but also is pivotal in the transverse direction thereto. It will be appreciated that because of the link arms, as each sleeve is forced axially of the shaft 20, the shaft will be forced to perform an orbital movement, for example in the direction of arrow A in FIG. 2, hence the discs 21 and 22 and output shafts 23 and 24 will be rotated.

If desired, the pivot point for each of the link arms 27A, 28A and 29A can be varied within the housing 33 or cylinder 12. This will have the effect of varying the compression within working chambers by altering the top and bottom dead center positions of the pistons. In addition, variation of the length of these link arms will enable the length of the "stroke" to be selected as desired.

Turning now to FIG. 3, the fluid operated motor illustrated is in many respects similar to the motor illustrated in FIGS. 1 and 2. Thus, it comprises a cylinder 112, pistons 114, 115, 116 and 117 movable axially therein and defining working chambers 118 and 119. In this embodiment, however, four shafts 120, 121, 122 and 123 are provided eccentrically of the cylinder 112, and sleeves 124, 125, 126 and 127 are axially reciprocable on respective ones of these shafts, each of these sleeves having a respective one of the pistons 114, 115, 116 and 117 mounted thereon. It will be appreciated that the respective pistons and sleeve could be one piece. Link arms 128, 129, 130 and 131 extend pivotally between a respective sleeve and an external pivot point as described and shown in detail in FIGS. 1 and 2. It will be seen in FIG. 3, however, that shafts 120, 121, 122 and 123 are mounted eccentrically on one face of a respective toothed disc 132, 133, 134 and 135, each of which is mounted for rotation within the cylinder 112. Discs 132, 133, 134 and 135 each mesh, through an appropriate aperture in the wall of cylinder 112 with external gears 136 mounted on external output shaft 137. Thus, orbital movement of shafts 120, 121, 122 and 123 caused by axial movement of pistons 114, 115, 116 and 117 and sleeves 124, 125, 126 and 127 on expansion or contraction of working chambers 118 and 119, and link arms 128, 129, 130 and 131 is transmitted as rotary motion to the output shaft 137

If desired, an external output shaft equivalent to output shaft 137 of FIG. 3 may be incorporated into the embodiment of FIGS. 1 and 2, such a shaft being mounted for example on the side of the cylinder 12 opposite to the housing 33. Similarly, a single through-shaft equivalent to shaft 20 of FIG. 1 may, if desired, be incorporated into the embodiment of FIG. 3 in place of the half shafts 120, 121, 122 and 123.

Figure 4:
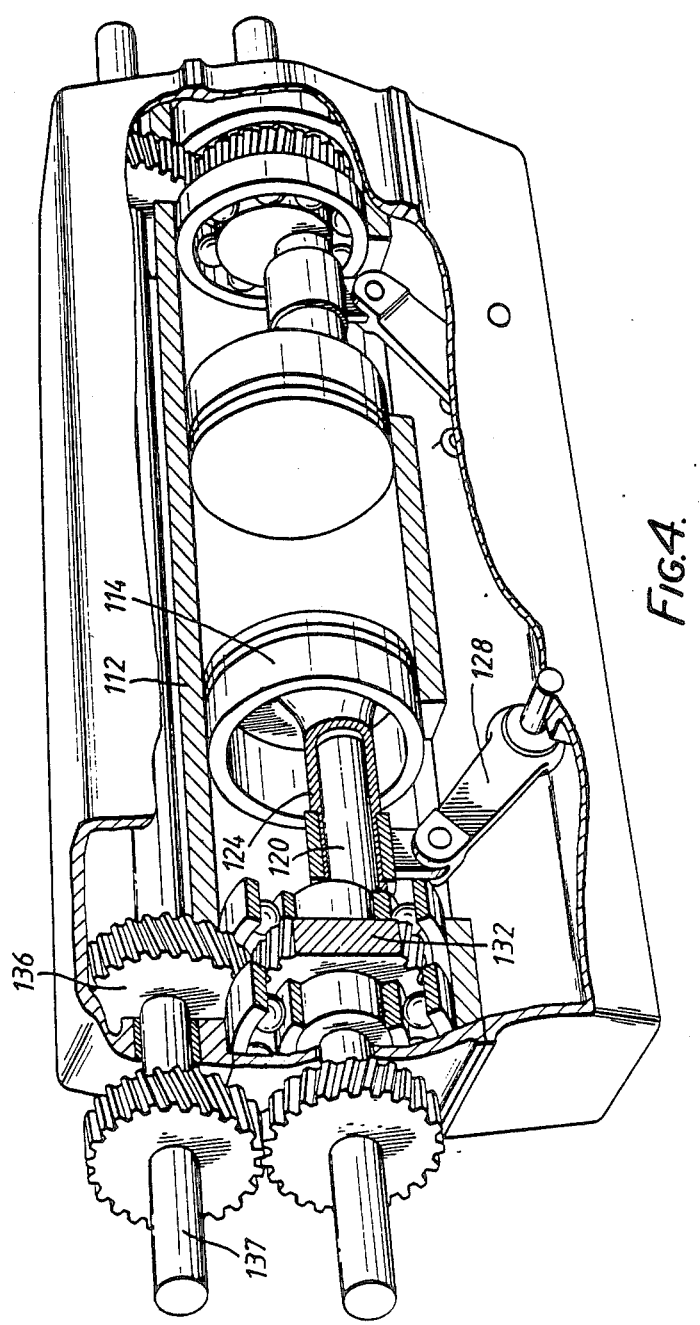
FIG. 4 is a cut-away perspective view of a unit of the present invention.

Referring to FIG. 4 there is shown an arrangement comprising a cylinder 112, two pistons 114 and 115 disposed therein with a working chamber therebetween. The interconnection between the pistons 114 and 115 to the output shaft 137 is the same and, as such, only the parts for piston 114 have been itemized. The piston 114 is operatively connected to an eccentric sleeve 124 which is reciprocable on connecting shaft 120 which in turn is connected to disc-like member 132. A link member 128 extends between the sleeve 124 and a mounting point which is fixed but enables limited universal movement of the link member 128 relative thereto. The disc member 132 has an external gear section which is connected to gear wheel 138 which in turn is operatively connected to shaft 137.

The operation of the device shown in FIG. 4 is the same in principle to that described earlier. Working fluid is adapted to enter and be discharged from the working chamber between the pistons so that power can be transmitted to output shaft 137.

Referring to FIG. 5, there is shown a cylinder 12 with a piston 14 moveable axially therein. The face or crown 14A of piston 14, with the face or crown 15A of second piston 15 mounted within cylinder 12, and with the inner wall of cylinder 12, defines a working chamber 19 in cylinder 12. This arrangement is essentially the same as that shown in FIG. 4. Other components of the portion of the engine depicted in FIG. 5 all having corresponding features described earlier in the specification (and thus requiring no further explanation) are shaft 20 which is eccentric of cylinder 12, sleeve 29, disc 21, output shaft 24, housing 33, link arm or link 27, slot 30 in cylinder 12, and pivotal mounting arrangement 34 which includes a shaft 35 connected to housing 33. The operation of an engine or pump having these features will be apparent from the earlier description.

As shown, there is provided in shaft 24, disc 21 and shaft 20 of at least one channel (a single channel 40 is shown in FIG. 5) through which a fluid can pass, to enter the region in cylinder 12 which is located between the back of piston 14 and the disc 21, and/or to enter other parts of the engine. To permit the fluid to enter the region between piston 14 and the disc 21, at least one aperture 41 will be provided in shaft 20 and its surrounding sleeve 29, to provide a passage to enable the fluid to leave the channel 40.

The fluid which flows through channel 40 will normally be a lubricant (such as oil), a coolant or a gas which also cools the pistons of the engine.

If the fluid is oil, it will normally enter the sump of the engine, in the bottom of housing 33, through the slot 30. If the fluid is a gas, it will also leave the inside of cylinder 12 through slot 30, to be vented to atmosphere through an aperture or valve in housing 33. If the interior of the housing 33 is to be maintained at a pressure which is greater than atmospheric pressure, the venting to atmosphere will be through a valve.

If the fluid is to be used only to cool the pistons, aperture 41 will be omitted and the fluid will be supplied, via orifice 42 which connects with channel 40, to the hollow interior region 14B of piston 14. The coolant fluid will then leave region 14B via (a) a second channel running parallel to channel 40, (b) at least one aperture 43 in the rear of piston 14, or (c) at least one aperture (not shown in the drawing) which is located in the side wall of piston 14, rearward of the compression piston rings. It will be appreciated that in some applications no piston rings would be necessary. If this coolant is, or contains, oil which is also used for lubrication, it may leave the region 14B via at least one aperture located in the side wall of piston 14 rearward of the compression piston rings but forward of the scraper or oiler ring (if present). Aperture 43 may be provided with a valve to control the flow of coolant through the aperture. In another arrangement, the aperture may be omitted thereby providing a cushioning effect on the stroke.

The fluid may be pumped through channel 40, or it may be circulated through channel 40 by the combination of one-way valves and the reciprocal movement of the piston 14, or it may be circulated solely by the reciprocal movement of the piston 14. The same arrangements may be adopted if the fluid has to flow through more than one channel, or in one direction through one channel and in the reverse direction through another channel. If one-way valves are used, they may be positioned in any suitable location in the flow path of the fluid.

Referring to FIG. 6 there is shown a modification which comprises the use of a plurality of links or link arms 50 connected to each sleeve 29. It should be noted that sleeve 29 is normally attached to shaft 20 in such a manner that there is no rotational movement between shaft 20 and sleeve 29. Thus it is not essential that shaft 20 has a circular cross-section. The circumference of a section through the shaft 20 may be circular but with one or more chords replacing part of the circle, or it may be elliptical, or hexagonal, or the shape of any other polygon, or (in general terms) any continuous or interrupted conic section. Desirably, the bearing surface 23 on which the connection to one end of link moves, has a circular cross-section using a shaft 20 having a non-circular cross-section, one end of which is seated in a small well in the back of piston 14, prevents the tendency of the side of the piston 14 to touch the inner wall of cylinder 12 during rotation of the piston.

The ends of link arms 50 which are remote from sleeve 29 are connected to respective pivotal mounting points connected to rods 55 mounted on to the housing 33 of the engine.

An alternative arrangement (not shown in the drawings) is to provide a mount to receive each rod 55, respectively, by affixing a bracket (or a plurality of brackets) to the exterior of the cylinder 12, with the (or each) bracket having at least one bearing point adapted to receive an end of a rod 55.

The use off two or more links 55 improves the smoothness of operation of the engine.

Another feature that may be incorporated into engines and pumps of the type discussed above is the mounting of the shafts 20 and 20A (see FIG. 1) of an opposed pair of pistons 14, 15 so that the axes of shafts 20 and 20A are not substantially co-linear. Preferably, the shafts 20 and 20A are mounted so that their axes lie on different radial planes passing through the axis of cylinder 12. More preferably shafts 20 and 20A are mounted so that their axle lie on radial planes of cylinder 12 which are 180° apart (that is, they lie on a diametral plane of cylinder 12).

Yet another feature that may be incorporated into engines or pumps of this type is the shaping of the crowns or faces of the opposed pistons in such a manner as to achieve maximum turbulence or swirl of the combustion gases (or combustion aerosols or other type of combustion fluid) in the case of an engine, or of the gases, liquid or slurry in the case of a pump.

I claim:

1. A rotary/linear converter comprising:
   a first member having a central axis and being adapted for linear movement in the direction of said central axis;
   a second member adapted for rotational movement;
   connecting means operatively interconnecting said first and second members so that respective linear or rotational movement of one said member causes respective linear or rotational movement of the other said member;
   characterized in that said connecting means comprises:
   a connecting shaft disposed eccentrically of said central axis of said first member;
   first coupling means operatively connecting said first member to said connecting shaft such that axial reciprocation of said first member causes orbital movement of said connecting shaft and vice versa; and
   second coupling means operatively connecting said connecting shaft to said second member so that said orbital movement of said connecting shaft causes rotation of said second member and vice versa, wherein said first coupling means comprises a sleeve operatively connected to said first member for axial reciprocation therewith, said sleeve being associated with said connecting shaft for axial reciprocation relative thereto and at least one link member extending between said sleeve and a mounting which is in a fixed position.

2. A rotary/linear convertor according to claim 3 further including a guide within or along which said first member is moved.

3. A rotary/linear convertor according to claim 2, wherein said first coupling means comprises a plurality of link members extending between said sleeve and respective mountings which are fixed.

4. A rotary/linear converter according to claim 2, wherein each said link members is pivotally connected to said sleeve and to said mounting for limited universal movement.

5. A rotary/linear convertor according to claim 2 wherein said first member comprises a piston and said guide comprises a cylinder having a working chamber therein, inlet means and outlet means communicating with said working chamber for the admission and removal of said working fluid therefrom.

6. A rotary/linear converter according to claim 5 wherein said first member comprises two pistons disposed within said cylinder there being a single working chamber disposed between said pistons.

7. A rotary/linear convertor according to claim 1 further including a lubricating and/or cooling system comprising a delivery channel in said connecting shaft and said second coupling means for delivering lubricant and/or coolant from externally of the convertor to said first member so that the orbital movement of said connecting shaft assists in distributing the fluid at selected positions at or around said first member.

8. A rotary/linear converter comprising:
   a first member having a central axis and being adapted for linear movement in the direction of said central axis;
   a second member adapted for rotational movement;
   connecting means operatively interconnecting said first and second members so that respective linear or rotational movement of one said member causes respective linear or rotational movement of the other said member;
   characterized in that said connecting means comprises:
   a connecting shaft disposed eccentrically of said central axis of said first member;
   first coupling means operatively connecting said first member to said connecting shaft such that axial reciprocation of said first member causes orbital movement of said connecting shaft and vice versa; and
   second coupling means operatively connecting said connecting shaft to said second member so that said orbital movement of said connecting shaft causes rotation of aid second member and vice versa, wherein said second coupling means comprising a disc-like member mounted for rotation about an axis, said connecting shaft being eccentrically connected with respect to said axis to said disc-like member, said second member being operatively connected to said disc-like member.

9. A rotary/linear convertor according to claim 8 wherein said second member is operatively connected to said disc-like member co-axially therewith.

10. A rotary/linear converter according to claim 8 wherein said second member is radially displaced from the axis of said disc-like member and operatively connected thereto by transmission means.

11. A rotary/linear convertor according to claim 10 wherein said disc-like member comprises a circumferential gear section adapted to engage a further gear which is operatively connected to said second member.

* * * * *